United States Patent [19]

Roberts, Jr. et al.

[11] 4,171,263

[45] Oct. 16, 1979

[54] PRESSURIZED OXYGENATION OF SEWAGE

[75] Inventors: Thomas E. Roberts, Jr., Saratoga; Bruce M. Wright; Clyde D. Watson, both of San Jose; John A. Abbott, Menlo Park, all of Calif.

[73] Assignee: FMC Corporation, San Jose, Calif.

[21] Appl. No.: 822,594

[22] Filed: Aug. 8, 1977

Related U.S. Application Data

[63] Continuation of Ser. No. 671,659, Mar. 29, 1976, abandoned, which is a continuation of Ser. No. 501,423, Aug. 28, 1974, abandoned.

[51] Int. Cl.² ............................. C02C 1/06; C02B 1/34
[52] U.S. Cl. .......................................... 210/8; 210/15; 210/60; 210/63 R
[58] Field of Search ...................... 210/63 R, 205, 206, 210/221, 7, 8, 14, 15, 60

[56] References Cited

U.S. PATENT DOCUMENTS

| | | | |
|---|---|---|---|
| 3,179,225 | 4/1965 | Vrablik | 210/221 |
| 3,243,046 | 3/1966 | Kakumoto et al. | 210/205 |
| 3,530,990 | 9/1970 | Grimshaw | 210/205 |
| 3,617,537 | 11/1971 | Vermette | 210/205 |
| 3,779,913 | 12/1973 | Martin | 210/63 R |
| 3,799,511 | 3/1974 | Svantesson | 261/120 |
| 3,926,588 | 12/1975 | Speece | 210/63 R |

Primary Examiner—Thomas G. Wyse
Attorney, Agent, or Firm—R. S. Kelly

[57] ABSTRACT

An activated sludge sewage treatment process which includes a mixed liquor tank and a pressure vessel much smaller in size than said mixed liquor tank. At least a portion of the influent to said tank is directed to the pressure vessel where oxygen is dissolved therein under superatmospheric pressures. The pressure is then released and said portion of the influent gently transferred into said mixed liquor tank so that substantially all of the dissolved oxygen remains in solution until said influent portion is mixed with the sewage in the mixed liquor tank to thereby raise the dissolved oxygen concentration in the tank.

14 Claims, 15 Drawing Figures

FIG_4

FIG_7

FIG_8

FIG_9

FIG_10

FIG_11

FIG_12

FIG_13

FIG_14

FIG_15

PRESSURIZED OXYGENATION OF SEWAGE

This is a continuation, of application Ser. No. 671,659 filed Mar. 29, 1976 which was a continuation of Ser. No. 501,423 filed Aug. 28, 1974, both abandoned.

BACKGROUND OF THE INVENTION

1. Field of the Invention

The present invention pertains to methods of and means for raising the concentration of a dissolved gas in a body of liquid, and more particularly, it pertains to a means for increasing the dissolved oxygen level of the sewage within the mixed liquor tank in an activated sludge sewage treatment process.

2. Description of the Prior Art

In the treatment of sewage by the conventional activated sludge process, the bacterial colony, known as the bio-mass, converts the carbon-hydrogen compounds within the sewage to more bio-mass, carbon dioxide and water. As is well known, oxygen is an essential ingredient in this fermentation process. During the course of treatment of the sewage, enough oxygen must be dissolved therein to oxidize essentially all of the biodegradable matter.

The rate at which oxygen is dissolved in water at any given instant is a function of (1) interfacial contact area and (2) the driving force, which can be defined as the difference between the concentration of oxygen in water at saturation and the concentration at that instant ($C_S$-C). Interfacial contact area between the oxygen and the water is usually obtained by agitation of the water, a process which requires the input of energy and is therefore an important cost in the activated sludge treatment of sewage. In conventional treatment of the sewage with air, i.e., where oxygen in the form of air is to be dissolved in the sewage, ($C_S$-C) is seven or eight milligrams per liter and interfacial area must be provided sufficient to dissolve the required oxygen fast enough to meet the demand of the bio-mass. When ($C_S$-C) is maintained higher, the agitation requirement is lower, but, of course, the lower concentration of oxygen in the mixed liquor requires a greater amount of time to be expended in the treatment process. The oxygen concentration at saturation, $C_S$, is proportional to the partial pressure of oxygen in the contacting gas. Oxygen pressure in air is 0.21 atmospheres, and $C_s$ is therefore about 9 milligrams per liter at 70° F. When pure oxygen is used (partial pressure one atmosphere), $C_s$ is about 43 milligrams per liter, and rate of dissolution of the oxygen into the sewage is about five times as high as it is when air is being used—other factors being equal. Thus, when using pure oxygen, the costs for agitating the mixed liquor are reduced; however, the cost of producing oxygen from air for use in the sewage treatment process usually offsets this savings.

One method of hastening the sewage treatment process and reducing the agitation costs would be to use pure oxygen at elevated pressures wherein $C_S$ will be proportionately higher. For example, at a pressure of 200 psig (14+ atmospheres), $C_s$ is about 600 milligrams per liter. Use of oxygen under such increased pressures would greatly reduce the agitation and time requirements for the sewage treatment process, but the cost of constructing mixed liquor tanks to handle these higher pressures has proven, in general, to be prohibitive. Prior art patents which show sewage treatment processes wherein oxygenation is carried out under increased pressures include the prior patents to Othmer U.S. Pat. Nos. 3,772,187; Martin 3,779,913; Neel 3,808,123; Cervantes 3,804,055; and Zimmerman 2,665,249.

Another form of the use of pressurized oxygenation in a sewage treatment process is disclosed in U.S. Pat. No. 2,809,933 to Halvorson. In the process disclosed in this patent oxygen under superatmospheric pressure is dissolved within sewage influent in a closed pressure treatment tank. After an initial treatment time, comprising a time period of from 2–30 seconds, the immediate oxygen demand of the sewage is satisfied and a valve is opened from the treatment tank to discharge the oxygenated influent to a trickling filter or other sewage treatment system employing aerobic bacteria.

Finally, systems have been proposed for recycling a portion of the sewage which is undergoing treatment in the mixed liquor tank and for inserting oxygen into this recycled stream. Such a system is shown, for example, in U.S. Pat. No. 3,477,947 to Kappe. Other systems of the same general type, and generally known as bio-precipitation processes, are described on pages 127-134 and 176-188 of "Applications of Commercial Oxygen to Water and Waste Water Systems", Water Resources Symposium No. 6, Edited by Richard E. Speece and Joseph F. Malina, Jr., published by the Center for Research in Water Resources, University of Texas at Austin, Tex. (1973).

SUMMARY OF THE INVENTION

By the present invention it has been discovered that the full benefits of pressurized oxygenation of sewage can be obtained without the self-defeating requirements of the prior art which required large pressure vessels wherein all or a part of the oxidation of the sewage was intended to be carried out. In accordance with the present invention, all or a portion of the sewage influent to the mixed liquor tank in an otherwise conventional activated sludge treatment process is brought into a pressure vessel where oxygen is dissolved in the influent under pressures well above atmospheric. Then, said portion of the influent is dropped to atmospheric pressure and directed into the mixed liquor tank in a gentle manner substantially without the addition of any energy thereto so that virtually all of the dissolved oxygen will remain therein under supersaturated conditions. This influent is then diluted with the material in the mixed liquor tank where the conventional sewage digestion process takes place under atmospheric conditions. It is critical to the process of the present invention that the supersaturated solution be blended into the mixed liquor tank with a minimum of turbulence so that oxygen is not lost through ebullition prior to the mixing within the mixed liquor tank where the total oxygen concentration will be well below the saturation level (about 9 mg/l).

Contrary to the prior art beliefs, we have found that virtually all of the oxygen dissolved under very high pressures, in the range of 100 psig to 200 psig, can be maintained within the sewage influent so long as the influent is depressurized with a minimum of turbulence being imparted thereto and transferred in a relatively undisturbed manner into the mixed liquor tank. In a typical experiment carried out in accordance with the present invention, 0.6 liters of mixed liquor was agitated briefly in a vessel pressurized to 50 psig with pure oxygen. The gas pressure over the mixed liquor was released, and then the 600 milliliters of mixed liquor was drained out and mixed into a volume of 30 liters of mixed liquor. A subsequent measurement of the dissolved oxygen concentration of the mixed liquor showed 3.2 milligrams per liter of dissolved oxygen indicating that 97% or more of the $C_s$ value at 50 psig had been transferred to the large batch of mixed liquor.

Both the initial equipment costs and the aeration power costs of the sewage treatment system of the present invention will be lower than comparable costs for present sewage treatment equipment using a pressurized oxygenation approach primarily because a more or less conventional, open topped mixed liquor tank can be used to be operated solely at atmospheric pressure. All pressurized oxygenation is carried out in a considerably smaller pressure vessel which can be constructed to withstand considerable pressures without unduly increasing its initial cost.

As a further aspect of the present invention, we believe that we have discovered a new method whereby the dissolved gas concentration in a body of fluid can be increased by dissolving gas in a small body of fluid under high pressures and then gently releasing this pressure and transferring the fluid from the small body of fluid into a much larger body of fluid substantially without the addition of any energy thereto so that substantially all of the initially dissolved gas will remain in solution. This more basic method of the present invention has been found to have uses outside of the sludge digestion sewage processing field as, for example, in the treatment of sewer lines with increased dissolved oxygen concentrations in order to prevent anerobic decomposition processes from taking place within the closed sewer lines.

DESCRIPTION OF THE PREFERRED EMBODIMENTS

Figure 1:
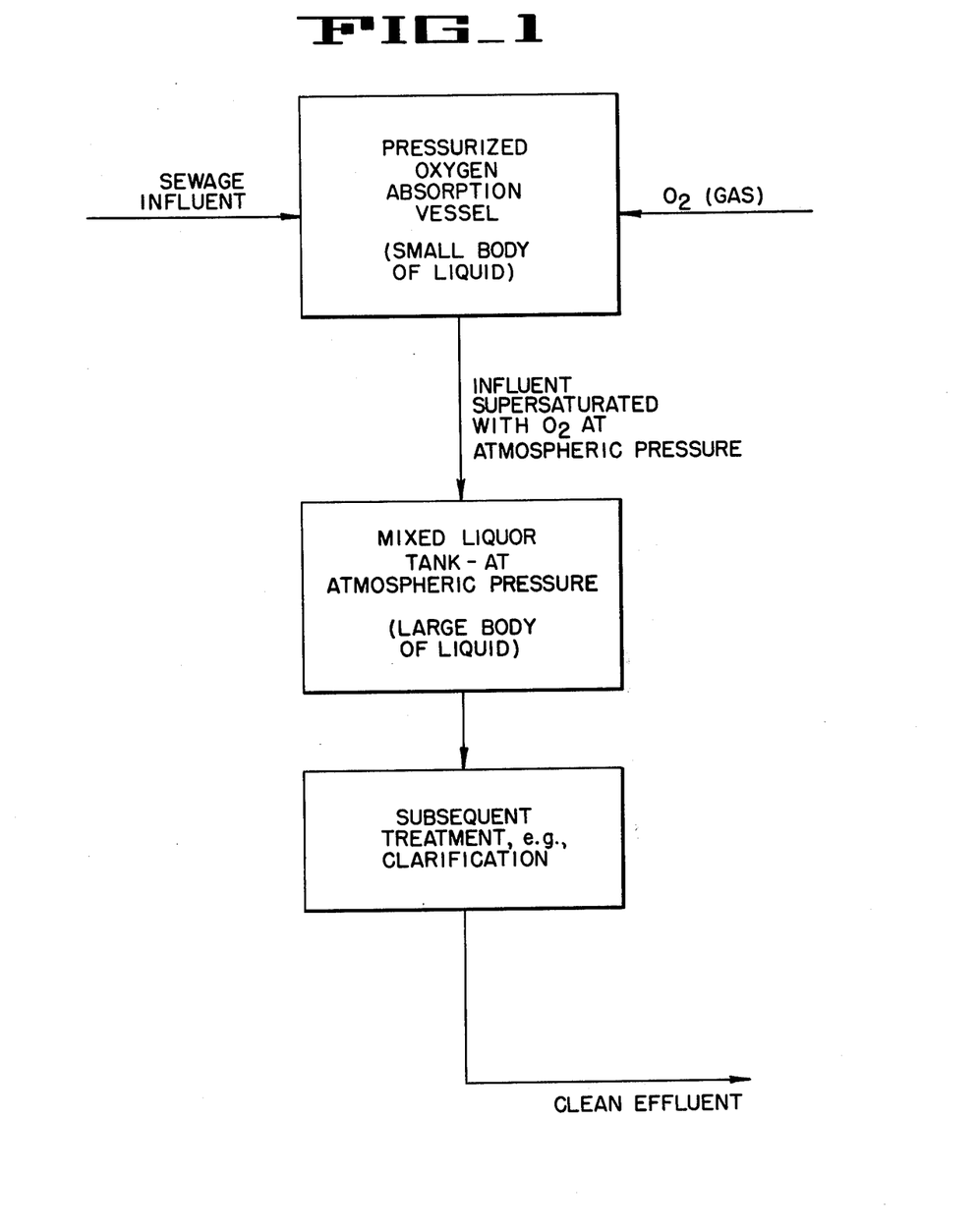
FIG. 1 is a flow diagram depicting the basic process of the present invention.

Referring now more particularly to the Drawings, it will be noted that FIG. 1 illustrates by means of a flow chart the basic gas dissolution process of the present invention. As shown, sewage influent and oxygen are directed into an absorption vessel which is pressurized by the incoming gas to cause an accelerated rate of dissolution of the gas into the sewage influent and to considerably raise the saturation level of the influent so that a greater amount of gas can be dissolved into a given quantity of sewage. Upon attaining a dissolution of oxygen in the influent equal to 50% or better of the maximum concentration permissible at the particular pressure within the absorption vessel, the oxygenated influent can be transferred out of the absorption vessel and it should be noted that such influent will be supersaturated with oxygen with respect to atmospheric pressure. This supersaturated influent is transferred into a mixed liquor tank which is operated at atmospheric pressure as indicated. It is in this mixed liquor tank that the entire activated sludge sewage treatment process is designed to be carried out in the conventional manner. As indicated in FIG. 1, the pressurized absorption vessel carries a very small body of liquid as compared with the body of liquid held in the mixed liquor tank. However, since the influent stream is supersaturated with oxygen, the dissolved oxygen level in the mixed liquor tank can be significantly raised by the oxygenated influent so that the oxidation processes occurring within the tank will be maintained at the requisite rate. Discharge from the mixed liquor tank is handled in a conventional manner wherein the overflow therefrom is directed into subsequent treatment equipment, such as a clarifier, wherein the sludge is settled out and the clear effluent is discharged and disposed of in the usual manner.

In accordance with the present invention it is desired that the oxygenated influent to the mixed liquor tank should have a dissolved oxygen concentration of about 250 milligrams per liter. Thus, regardless of whether air or pure oxygen is dissolved, a pressure of at least several atmospheres is required in the absorption vessel. While either air or pure oxygen can be used in the pressure vessel to dissolve oxygen into the influent it is preferred to use pure oxygen in order to improve the operating efficiency of the process. To dissolve 250 milligrams of oxygen into each liter of the influent using a 90% pure oxygen at 70° F. in the pressure vessel requires a pressure of approximately 92 psig if the dissolving operation is carried to equilibrium, i.e., if the influent is saturated with dissolved oxygen in the pressurizing vessel. However, it is probably impractical to reach 100% dissolution, or saturation, in the pressure vessel, and to reach 90% of saturation requires roughly four times as long as it does to reach 50% of saturation. Consequently, for an economically small pressure vessel, it is proposed to pressurize to a considerably higher pressure, such as 200 psig, and to dissolve oxygen at such pressure to 50% of saturation, or about 250 milligrams per liter. There will be a small net increase in energy requirement for this approach both to compress the oxygen to the higher level and to compress the sewage influent in the pressure vessel to the higher level. However, these small increases in energy requirement are generally insignificant. With vigorous agitation of the influent in the pressure vessel, the time required to reach 50% of saturation should, in general, be less than thirty seconds.

In accordance with the teachings of the present invention it is to be recognized that a very critical step in the process is the release of the pressure on the oxygenated sewage influent to bring it down to atmospheric pressure while imparting a minimum of turbulence thereto and the transfer (which may be accomplished simultaneously or sequentially with release of pressure) of the influent into the mixed liquor tank in a gentle manner substantially without the addition of energy thereto so that ebullition from the supersaturated influent will be held to an absolute minimum. This can be accomplished with the suggested systems to be set forth hereinafter.

Figure 2:
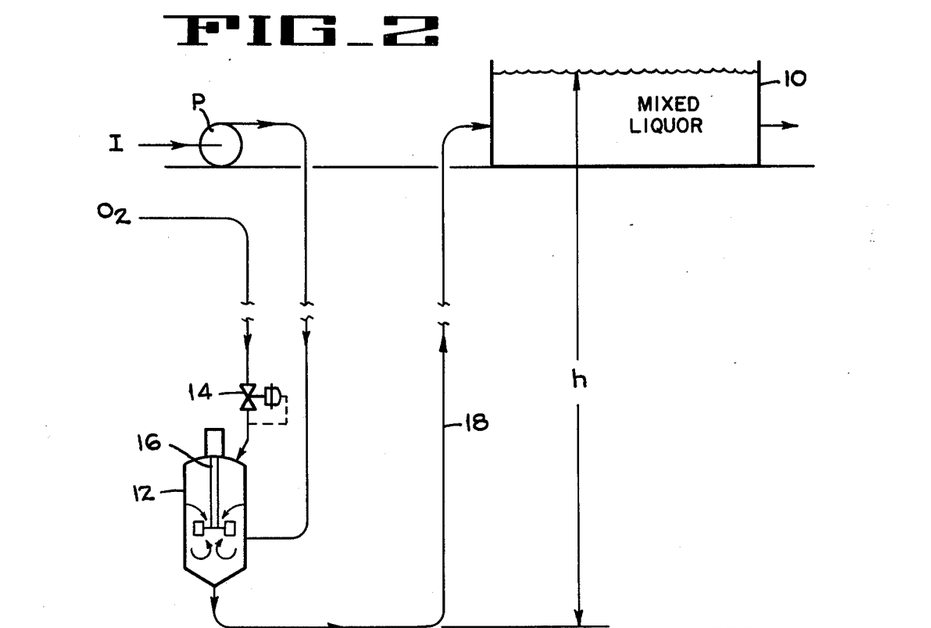
FIG. 2 is a diagrammatic illustration of one form of apparatus for carrying out the process of the present invention as a continuous or through-flow process.

Referring first to FIG. 2, a system for oxygenating the sewage influent to a mixed liquor tank 10 is shown which utilizes a device somewhat similar to the U-tube aerator of the prior art to provide a continuous delivery of oxygenated influent to the mixed liquor tank. In this arrangement all of the influent I is delivered under high pressure by a pump P into a pressure vessel 12. The pressure vessel is continuously pressurized to the pressure of the incoming oxygen supply as set by a throttling valve 14. The influent within the pressure vessel is subjected to continuous agitation by means of a rapidly driven paddle-type agitator 16 which causes a fluid flow within the vessel as indicated by the arrows. In accordance with the present invention the pressure vessel 12 is located at the lowest point of the system and is connected by a upstanding conduit 18 to the mixed liquor tank 10. The head represented by the height h of the liquor in the mixed liquor tank above the fluid at the discharge throat of the pressure vessel is then set so as to equal the pressure within the pressure vessel set by the oxygen pressure valve 14. Thus, there will be no pressure drop across the discharge throat of the pressure vessel which would cause turbulence and ebullition of the oxygen from the influent transfer stream. Also, no special pumping means are required, and the influent stream rises directly into the mixed liquor tank where it is blended with the sewage therein to raise the dissolved oxygen concentration thereof.

While the system as shown in the schematic arrangement of FIG. 2 has the advantage that the transfer of oxygenated influent from the pressure vessel 12 to the mixed liquor tank 10 is accomplished with a minimum of turbulence and that a minimum number of elements are required for carrying out the pressurizing and transfer operation, it also suffers from the disadvantage that the height h of the pressure vessel beneath the mixed liquor tank will generally need to be 200 feet or more. This may not be practical in many locations. Also, with the vertically spaced relationship of the pressure vessel to the mixed liquor tank being pre-set, the working pressure within the pressure vessel is also set and may not be easily varied. Such a constraint may render the system impractical where variations in the BOD loading of the incoming sewage may require greater or lesser oxygen concentrations in the mixed liquor tank.

Figure 3:
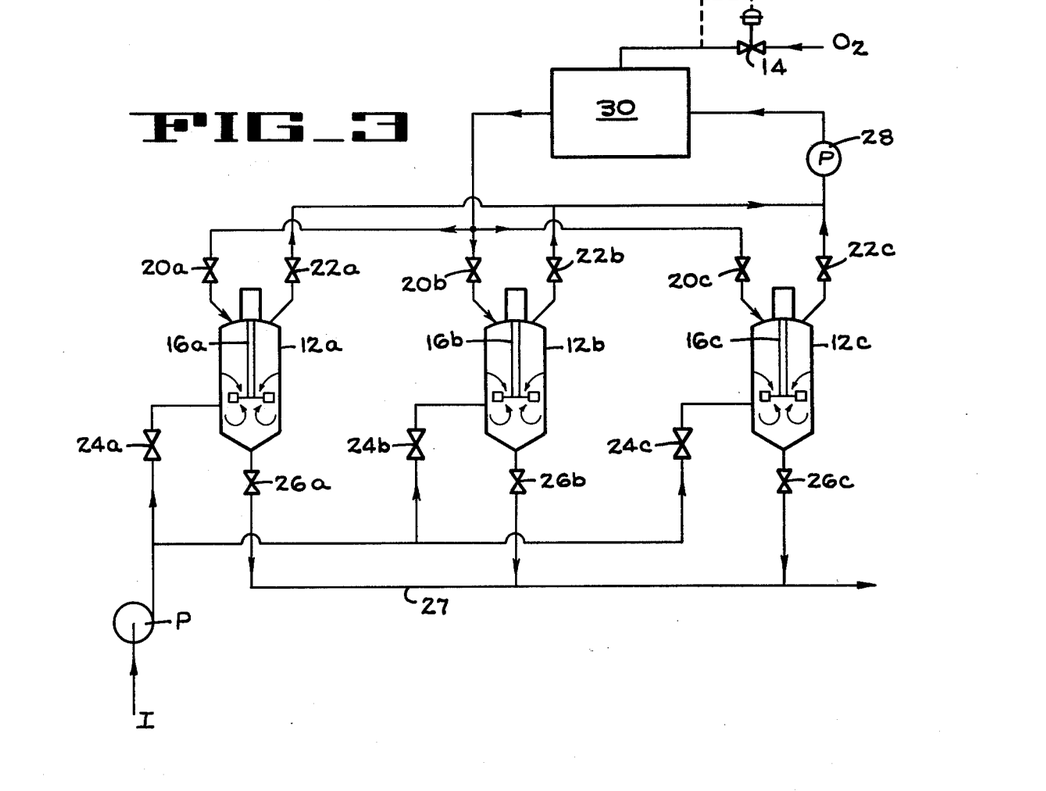
FIG. 3 is a diagrammatic illustration of a modified form of apparatus for carrying out the process of the present invention as a batch process.

An alternative batch process system for oxygenating the sewage influent I is shown in FIG. 3. This system includes three separate pressure vessels 12a, 12b and 12c, all of which are similar to the pressure vessel 12 of the apparatus of FIG. 2. Each pressure vessel is respectively provided with a supply of oxygen under pressure through a controlled valve 20a, 20b or 20c and is further provided with a vent through a controlled discharge valve 22a, 22b or 22c. The flow of the sewage influent into the pressure vessels is provided by a low pressure pump P and is controlled by valves 24a, 24b and 24c while the oxygenated discharge from the pressure vessels is controlled by a separate set of valves 26a, 26b and 26c. All of the discharge lines from the pressure vessels are connected with a discharge conduit 27 which directs the oxygenated influent into the mixed liquor tank in a manner to be set forth in greater detail hereinafter.

The pressurized oxygen supply passes through a throttling valve 14 which maintains a pre-set pressure on the oxygen supply which is maintained within an accumulator or holding tank 30. This accumulator is directly connected with each of the pressure vessels through the inlet valves 20a, 20b and 20c thereof. In order to conserve oxygen, the vent valves 22a, 22b and 22c are connected through a booster pump 28 to the accumulator so that a closed pressurizing system is provided whereby oxygen which is not dissolved in the influent sewage stream will be returned to the system to be reused. The booster pump also serves to maintain the system at zero gauge pressure through the venting valves as the influent is filled and discharged from the vessels.

The apparatus of FIG. 3 is designed to operate on a three-stage cycle so that one pressure vessel will be undergoing filling while a second pressure vessel is pressurized to oxygenate the influent and while the third pressure vessel is dumping the previously oxygenated influent into the discharge line 27. For example, if we consider that the pressure vessel 12a is being filled, then the valve 24a will be opened to allow pump P to pump the influent I therein and valves 20a and 26a will be closed. Valve 22a will be opened to provide communication between vessel 12a and vessel 12c through opened vent valve 22c. Thus as oxygen is displaced within vessel 12a it will fill vessel 12c to permit the oxygenated influent to be discharged without turbulence through the open valve 26c. Valves 24c and 20c will, of course, be closed. During the time that vessel 12a is filling and vessel 12c is dumping, vessel 12b will be carrying out the oxygen absorption operation. This is carried out in several stages. First, after having been previously filled and with fluid flow valves 24b and 26b closed, vessel 12b is partially pressurized through open vent valve 22b when the previously pressurized vessel 12c is vented through valve 22c. Then, valve 22b is closed and 20b opened to bring the pressure up to the pressure within accumulator 30. The mechanical rotary agitator 16b is then switched on and rapidly rotated to provide the requisite amount of oxygen absorption. Enough time is provided to oxygenate the influent to the desired degree as previously discussed. Next, the agitator 16b is switched off, the valve 20b is closed, and the excess oxygen bubbles are allowed to disperse. The pressure in 12b is then released in two stages: first, an immediate release of pressure into the just-filled vessel 12a as vent valve 22b is opened, and second, a further gradual reduction in pressure to zero gauge pressure as the pump 28 exhausts the oxygen to the accumulator.

As the vessel 12b is releasing the pressure, the vessel 12a is being pressurized prior to oxygenation of the influent therein, and filling is initiated in vessel 12c by opening valve 24c and closing valve 26c. The previously described procedure is then repeated. At the end of the next time period, the sequence is again changed so that pressure vessel 12a is dumped, pressure vessel 12b is filled, and the influent within pressure vessel 12c is oxygenated. At the conclusion of the next time period the entire three-stage process is repeated. Although not shown, it will be recognized that a suitable control means is provided to sequentially actuate each of the various sets of valves 20, 22, 24 and 26 and to activate the agitators 16a, 16b and 16c for the appropriate part of the oxygenation portion of the operating cycle in order to permit the foregoing sequence of operations. Sufficient overlap in the operations being carried out by the vessels can be provided so as to permit a nearly continuous flow of influent into and out of the system.

Figure 4:
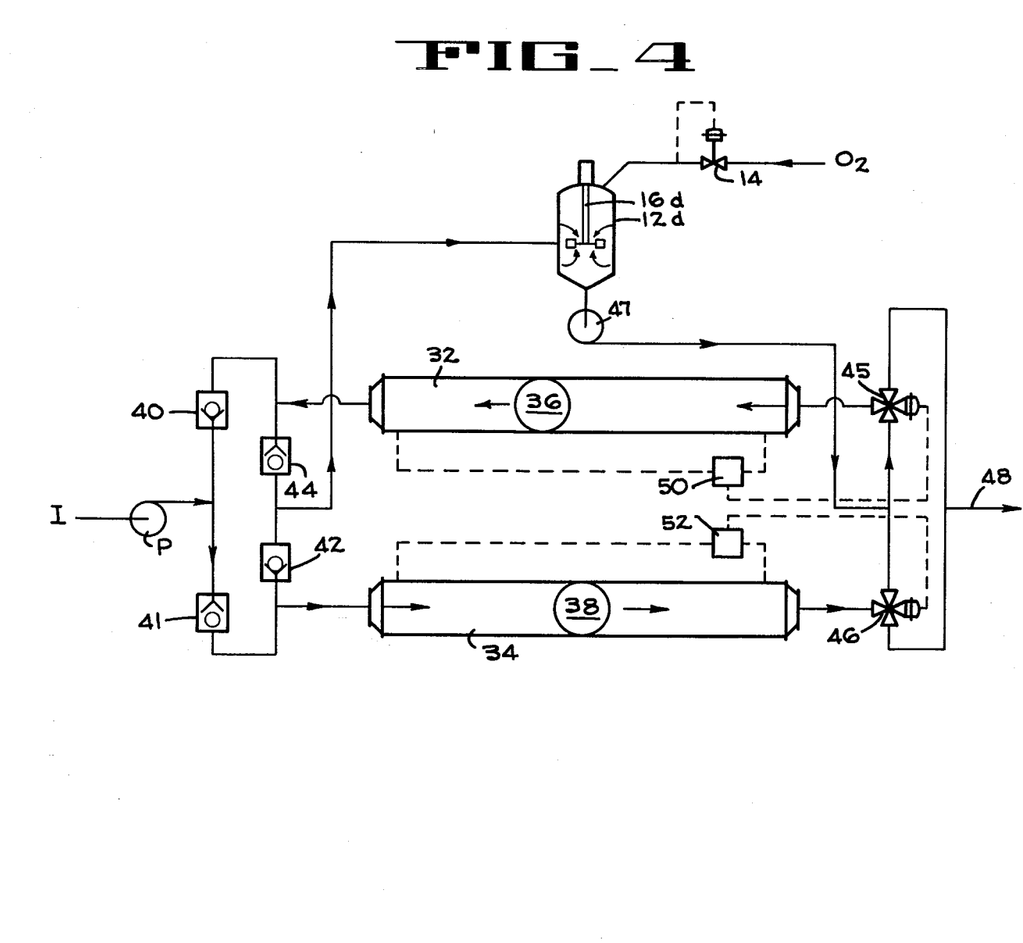
FIG. 4 is a diagrammatic illustration of a further modified apparatus for carrying out the process of the present invention as a batch process.

An alternative batch process oxygenation system is disclosed in FIG. 4 of the drawings. In this arrangement only a single pressure vessel 12d is utilized which vessel includes a rotary agitator 16d and is similar to the pressure vessel 12 previously described. The pressure vessel 12d is arranged for continuous operation whereby the oxygen supply through the pressure-setting valve 14 is continuously provided at a predetermined pressure. The influent I is directed into the pressure vessel 12d by a low pressure pump P which is connected with the system through a set of check valves 40, 41, 42 and 44 as shown. Discharge from the pressure vessel 12d is directed through a high pressure pump 47 and through selectively operated three-way valves 45 and 46 into pumping cylinders or lock hoppers 32 and 34. Each of these lock hoppers comprises a cylindrical cylinder within which there is received an inflatable ball pig 36 or 38 that is responsive to fluid pressure changes to shift its position within the cylinder. The ball pigs, or pipe line spheres, are conventional items which seal against the inner wall of the cylinder so as to divide the fluids within the cylinder. The ball pigs are moved back and forth within the cylinders by the fluid pressure changes in the system in a manner to be described hereinafter. For a further and more complete description of the lock hoppers, which are conventionally used for slurry pumping, reference is made to the publication entitled "Slurry Pumps A Survey" be Bechtel Incorporated, presented at the Second International Conference on the Hydraulic Transport of Solids in Pipes, Coventry, England, in September 1972.

The three-way valves 45 and 46 are sequentially controlled so that they either direct the oxygenated influent from the pressure vessel 12d into the cylinders 32 and 34, respectively, or from the cylinders 32 and 34, respectively, into a discharge line 48 leading to the mixed liquor tank. Conventional control means 50 and 52 are provided to operate the lock hopper cylinders which control means include position sensing devices (such as microswitches) located adjacent to each end of each cylinder for determining when the ball pigs have arrived at the end of their travel paths and using such information to switch the three-way valves 45 and 46 into their alternate positions.

The apparatus disclosed in FIG. 4 is designed to operate on a two-stage cycle. In the first stage of the cycle, as depicted in FIG. 4, the influent from pump P, which is at a relatively low pressure, passes through the check valve 41 and into the cylinder 34 to shift the ball pig 38 therein to the right and to discharge the previously oxygenated fluid from the right-hand side of the cylinder through the valve 46 and into the discharge line 48. This transfer is a slow and gentle one since the pressure supplied by pump P will be relatively low. Simultaneously, influent undergoing oxygenation within the pressure vessel 12d will be directed by the high pressure pump 47 through the three-way valve 45 and into the right-hand side of cylinder 32 to shift the ball pig 36 therein to the left and to push the influent in the left-hand portion of the cylinder out through the check valve 44 and into the pressure vessel. Check valves 40 and 42 remain closed due to the fact that the pressure within cylinder 32 is considerably higher than is the pressure within cylinder 34. When the ball pigs come to the end of their paths of travel within the cylinders, the control means 50 and 52 operate to reverse the positions of the three-way valves 45 and 46 and initiate the second stage of the operating cycle. Thus, the cylinder 34 will then be pressurized to operate on the high pressure side of the system and the cylinder 32 will be depressurized to operate on the low pressure side of the system. When the valve 45 is switched, the pressure on the previously oxygenated influent within cylinder 32 is dropped to atmospheric, and the influent will be moved out through the valve 45 into the discharge line 48. The valve 46 is switched to direct the next oxygenated batch from the pressure vessel 12d into the cylinder 34 at high pressure. Also, the positions of the check valves 40-44 are reversed by the change in pressure within the cylinders 32 and 34 so that valves 41 and 44 block while valves 40 and 42 are opened to direct a new charge of influent into the cylinder 32 and to direct the previously charged influent from cylinder 34 through the pressure vessel.

From the oxygenating apparatus, the oxygenated influent is transferred into the mixed liquor tank with as little disturbance as possible and as quickly as possible since water solution supersaturated with gas is meta stable and will tend to lose its excess content gradually if undisturbed. The solution will lose its excess gas content rapidly, however, if violently agitated or subjected to the stripping action of rising gas bubbles.

Figure 5:
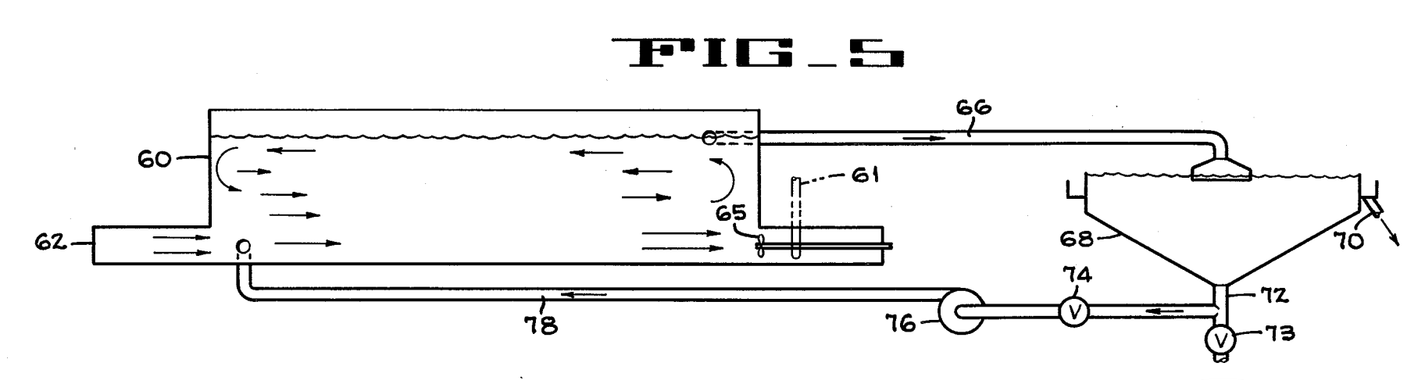
FIG. 5 is a diagrammatic sectional view of the apparatus for moving the oxygenated sewage influent from the oxygenating apparatus into the mixed liquor tank.
Figure 6:
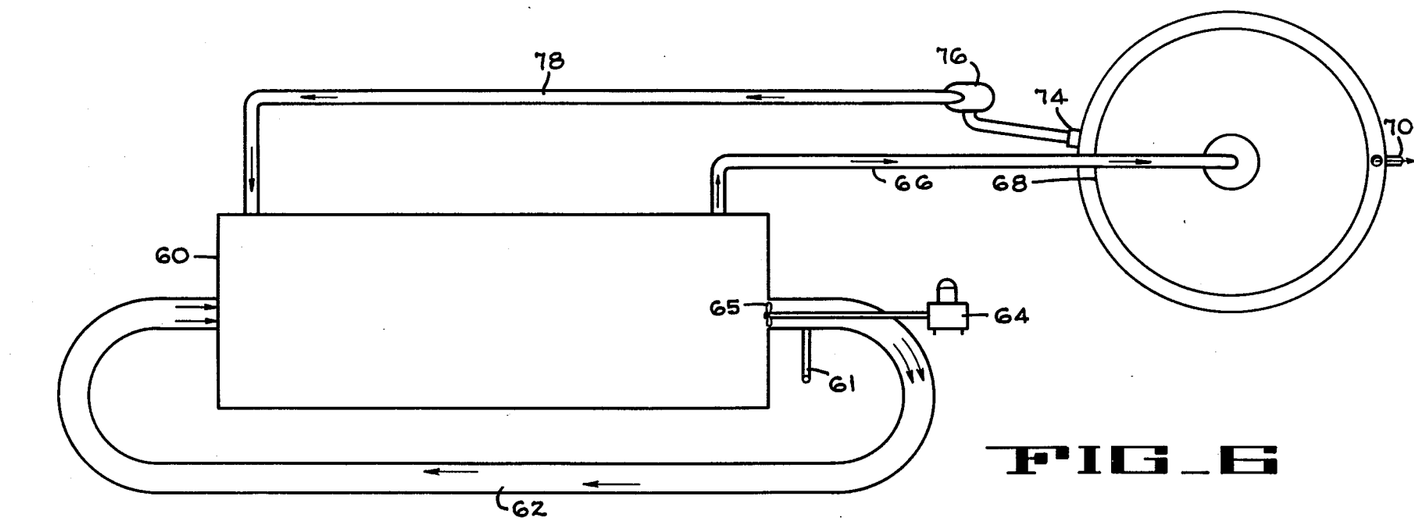
FIG. 6 is a diagrammatic plan of the apparatus shown in FIG. 5.

The means for gently transferring the fluid from the previously described pressure oxygenating apparatus into the mixed liquor tanks is shown in FIGS. 5 and 6. It will be seen that the mixed liquor tank 60 is provided with a closed recirculating conduit 62 which is in communication with the bottom portion of the tank at one end thereof and which extends in a closed loop path around to the opposite end of the tank. A circulating unit 64 is provided with a rotary driving blade 65 located at the entrance of the conduit 62 to continuously recycle a portion of the mixed liquor through the conduit at a linear velocity of about eight feet per second based on a 7 foot diameter circular conduit and a 140,000 GPM recycling rate. The oxygenated influent from the pressure vessels is directed from a line 61 into the inlet end of the conduit 62 so that it blends with the mixed liquor therein without much disturbance. It will be noted that the conduit 62 is considerably larger than the conduit 61 so that an immediate mixing operation is performed whereby supersaturated conditions will cease to exist shortly after the influent is injected into the recycling mixed liquor stream. In practice, the dilution ratio may preferably be about 20 to 1 although higher dilution ratios (up to about 30 to 1) can be used. It will be noted that the oxygenated influent enters the mixed liquor tank at the bottom thereof and well away from the atmosphere-mixed liquor interface at the top of the tank so that oxygen will not be driven off prior to the completion of the dilution operation.

As further shown in FIGS. 5 and 6, the overflow from the mixed liquor tank will be directed through an overflow conduit 68 into a conventional clarifier 68. The clarifier serves to separate the sludge from the relatively clean effluent which is directed out of the system through discharge line 70. The settled sludge within the clarifier is directed through a sludge return pipe 72 where its disposition is controlled by two controllable valves 73 and 74. A portion of the sludge is directed to a final processing operation for dewatering and removal and another portion is recycled back into the mixed liquor tank through the valve 74 by means of a pump 76 and return line 78. As noted, the recycled sludge will enter the mixed liquor tank directly adjacent to the heavily oxygenated recycled liquor stream where the oxygen therein can have an immediate effect.

Figure 7:
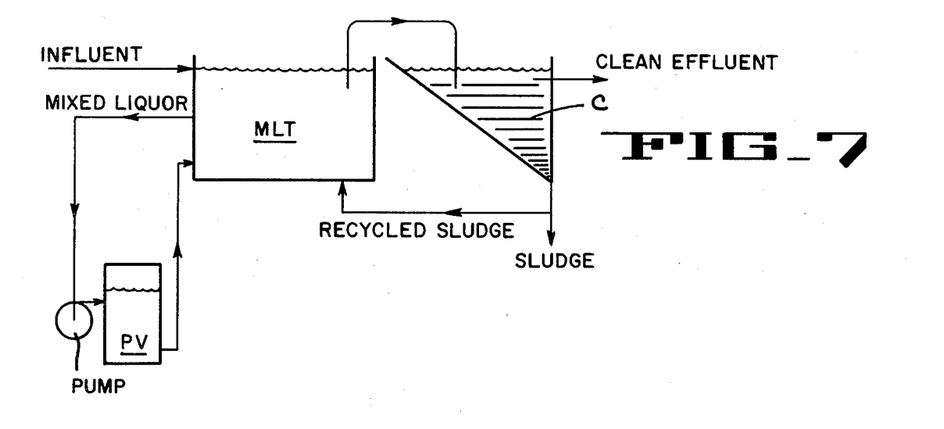
FIGS. 7–15 are diagrammatic illustrations of further alternative forms of sewage treatment systems for carrying out the sewage treatment process of the present invention.
Figure 8:
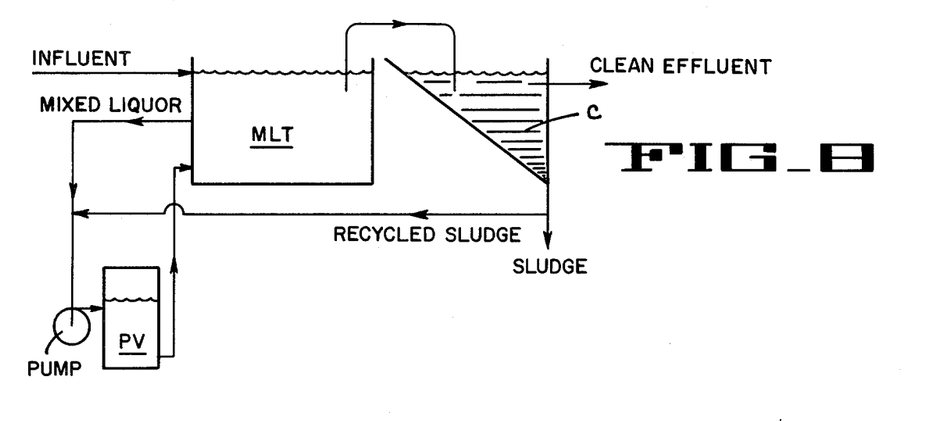
Figure 9:
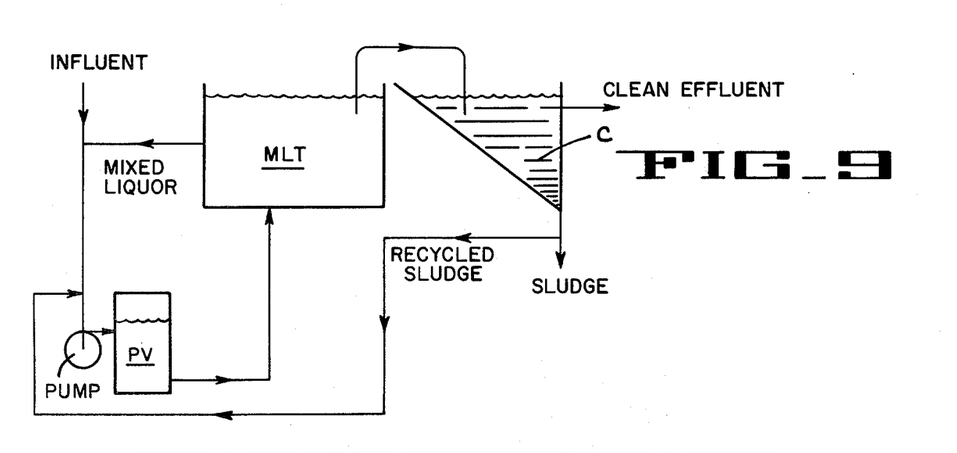
Figure 10:
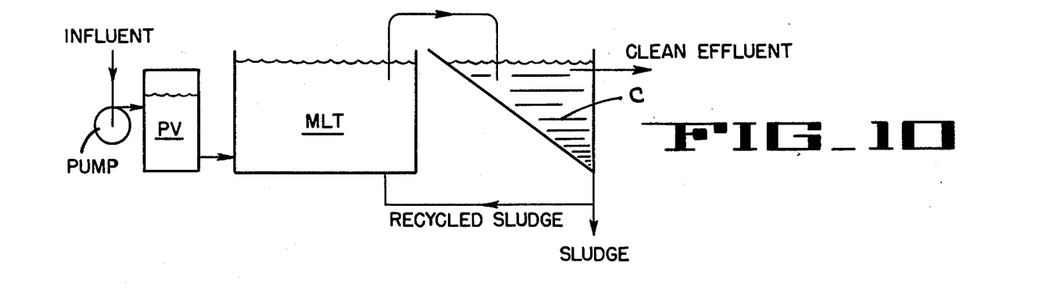
Figure 11:
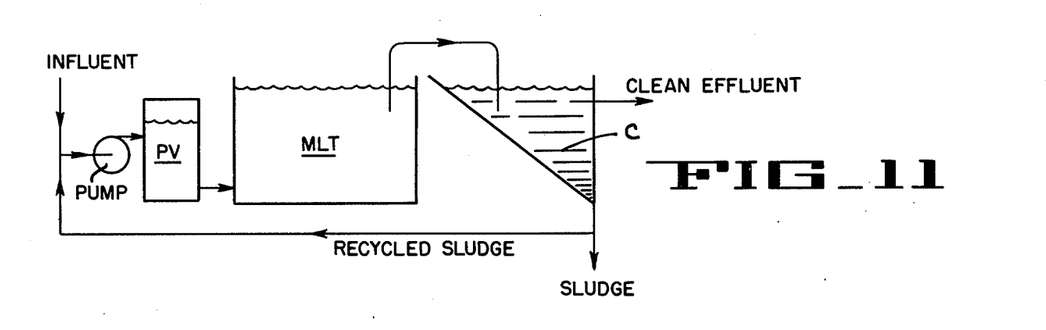
Figure 12:
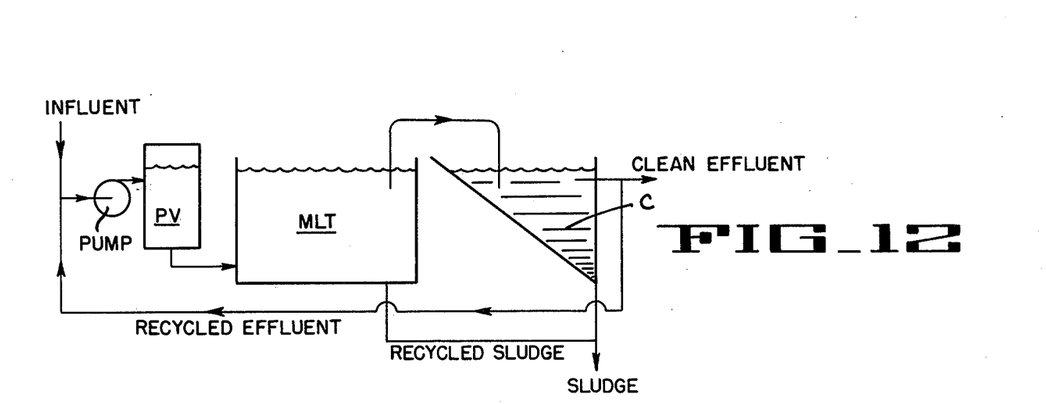
Figure 13:
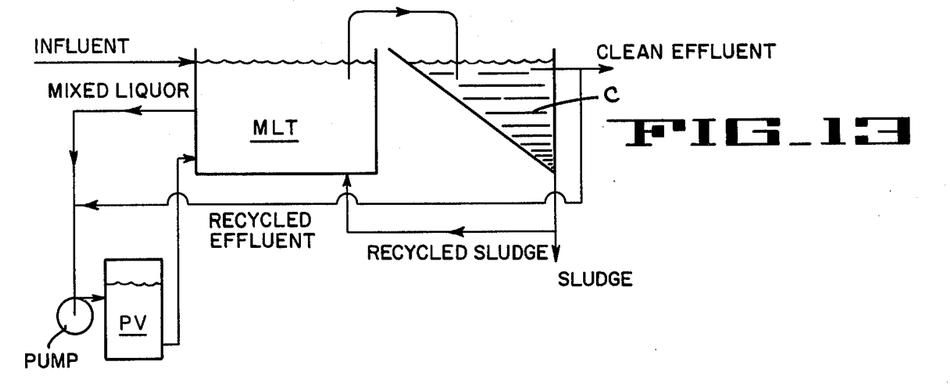
Figure 14:
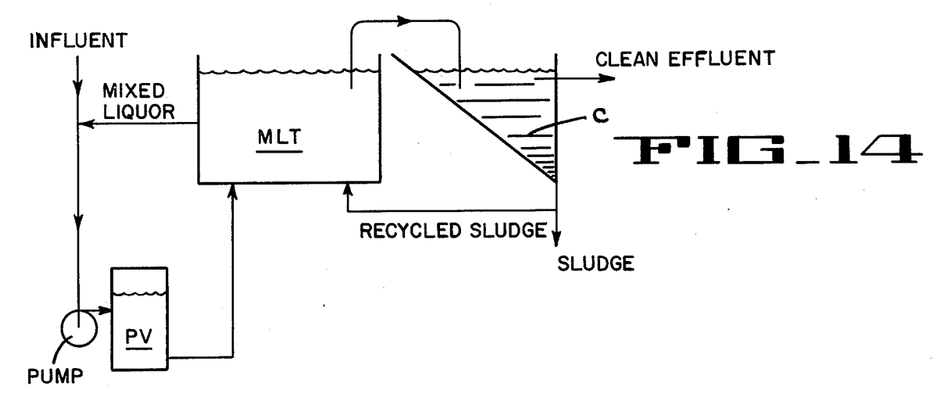
Figure 15:
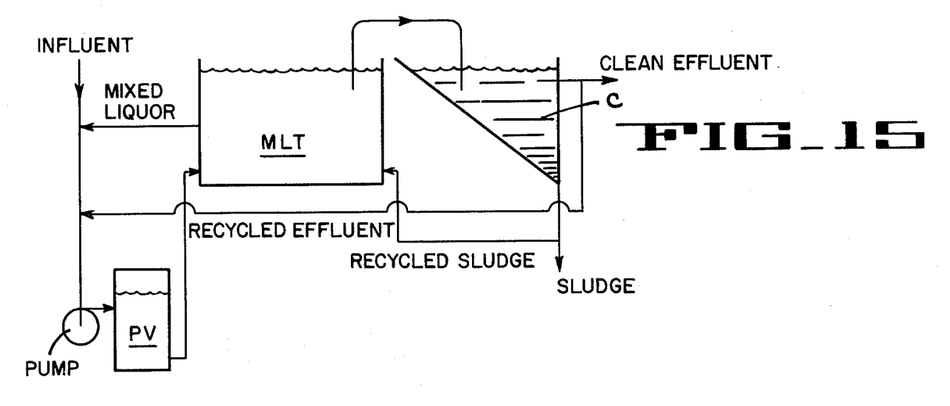

Further variations of the pressure vessel, mixed liquor tank and clarifier arrangement are indicated schematically in FIGS. 7-15 of the drawings. In each of these drawings the pressure vessel has been indicated by the designation PV, the mixed liquor tank has been indicated by the designation MLT, and the clarifier has been indicated by the designation C. In the arrangement of FIG. 7, all of the sewage influent is directed directly into the mixed liquor tank and a portion of the mixed liquor is recycled by the pump through the pressure vessel while a portion of the sludge is recycled back into the mixed liquor tank. In FIG. 8, an arrangement similar to FIG. 7 is shown except that the recycled sludge is directed into the oxygenating system so that it passes through the pressure vessel rather than being recycled directly into the mixed liquor tank. The FIG. 9 arrangement is similar to the FIG. 8 arrangement except that the influent, rather than being directed into the mixed liquor tank, is directed also through the pressure vessel whereby the recycled mixed liquor, the recycled sludge and the influent all pass through the oxygenating pressure vessel. In the FIG. 10 arrangement the recycled sludge is directed into the mixed liquor tank while all of the influent passes through the pressurizing vessel before moving into the mixed liquor tank. The FIG. 11 arrangement is similar to FIG. 10 except that the recycled sludge is directed into the influent line rather than being returned directly to the mixed liquor tank. In the FIG. 12 arrangement, clean effluent from the clarifier is recycled into the oxygenation system along with the total sewage influent. In the FIG. 13 arrangement a system is provided wherein the input to the oxygenating pressure vessel comprises recycled clean effluent from the clarifier along with recycled sewage from the mixed liquor tank while all of the sewage influent is directed into the mixed liquor tank and with the recycled sludge also being returned directly into the mixed liquor tank. The FIG. 15 arrangement is similar to that of FIG. 13 except that the sewage influent is directed into the oxygenation system along with the recycled clean effluent and the recycled mixed liquor. Finally, the FIG. 14 arrangement is similar to that of FIG. 15 except that only the sewage influent and the recycled mixed liquor are directed through the pressure vessel, all clean effluent being removed from the treatment system after passing through the clarifier. Other arrangements based on the arrangements of FIGS. 7–15 can be provided by dividing the sewage influent so that a portion thereof flows directly into the mixed liquor tank and another portion flows into the oxygenation system.

In a typical experimental apparatus arrangement provided to test the process of the present invention, 800 ml of mixed liquor was placed in a pressure vessel which was then charged with oxygen at 100 psig. The pressure vessel was then severely agitated for 30 seconds and vented with the dissolved oxygen concentration of the mixed liquor being raised to 272 mg/l. The contents of the pressure vessel were then drained by gravity directly into a container filled with 60 liters of mixed liquor with a dissolved oxygen concentration of 0.1 mg/l, and the liquor in the container was lightly stirred to effect complete mixing. The dissolved oxygen concentration of the mixed liquor in the container was then measured at 3.0 mg/l after the process thereby indicating that 84% of the initially dissolved oxygen remained in solution.

While the pressurized oxygenation technique of the present invention is functional with air as well as with pure oxygen, the latter is preferred.

With the teachings of the present invention it will be seen that a sewage treatment system can be provided wherein the benefits of high pressures for dissolving large amounts of oxygen into the sewage are utilized without requiring the large, and hence expensive, pressure vessels of the prior art. By dissolving the oxygen into small quantities of the sewage under high pressures, the total dissolved oxygen concentration of the sewage within the mixed liquor tank can be raised so that the overall activated sludge treatment process can be hastened. The process of the present invention is designed so that all of the required oxygen can be dissolved into the sewage in a single pass without necessitating continuous recycling as with other prior art processes. Various alternative apparatus arrangements have been shown for carrying out the process of the present invention which arrangements may be utilized in accordance with the particular treatment requirements found to be necessary.

Although the best modes contemplated for carrying out the present invention have been herein shown and described, it will be apparent that modification and variation may be made without departing from what is regarded to be the subject matter of the invention.

What is claimed is:

1. A method of raising the dissolved gas concentration of a body of liquid comprising the steps of dissolving a gas into a first body of liquid under superatmospheric pressure conditions of at least several atmospheres, decreasing said pressure to atmospheric while imparting a minimum of turbulence to said body of liquid so as to maintain said dissolved gas therein under supersaturated conditions, said depressurization step being accomplished without causing said body of liquid to flow along a path having a sharp or sudden pressure drop therein, and gently transferring said first body of liquid into a second body of liquid while imparting a minimum of turbulence to said first body of liquid so as to maintain said dissolved gas in solution, said second body of liquid being at atmospheric pressure and being substantially larger than said first body of liquid, and mixing said first body of liquid with said second body of liquid whereby the concentration of dissolved gas in said second body of liquid is raised.

2. A method of raising the dissolved gas concentration of a body of liquid according to claim 1 wherein said gas is oxygen.

3. A method of raising the dissolved gas concentration of a body of liquid according to claim 1 wherein said first body of liquid is pressurized and then brought to atmospheric pressure within a closed pressure vessel before the transfer of any of the liquid therefrom.

4. A method of raising the dissolved gas concentration of a body of liquid according to claim 1 wherein said first body of liquid is directed into said second body of liquid in the lowermost portion of the latter well away from the atmosphere-liquid interface.

5. A method of raising the dissolved gas concentration of a body of liquid according to claim 1 wherein said gas is dissolved into said first body of liquid at a pressure at least several times as great as atmospheric pressure.

6. In an activated sludge sewage treatment process wherein the biodegradable matter in the sewage is oxidized by dissolved oxygen acting on the sewage within a mixed liquor tank, the improvement comprising the steps of dissolving oxygen in at least a portion of the influent to the mixed liquor tank under superatmospheric pressure conditions of at least several atmospheres, releasing the pressure on said portion of the influent to bring it to atmospheric pressure while imparting a minimum of turbulence to said influent portion and maintaining it in a substantially undisturbed condition, said depressurization step being accomplished without causing said body of liquid to flow along a path having a sharp or sudden pressure drop therein, gently directing said portion of the influent into said mixed liquor tank while imparting a minimum of turbulence thereto so that the dissolved oxygen will be maintained in said portion of the influent under supersaturated conditions, and mixing said portion of the influent with the sewage in said mixed liquor tank and thereby raising the dissolved oxygen level of the sewage in the tank to increase the rate of said sewage treatment process.

7. In an activated sludge sewage treatment process according to claim 6 wherein said oxygen is dissolved in said portion of the influent at a pressure at least several times as great as that of atmospheric pressure.

8. In an activated sludge sewage treatment process according to claim 6 wherein said oxygen dissolution step is carried out in a closed pressure vessel which is sealed from said mixed liquor tank until after the reduction of pressure in said vessel to atmospheric pressure.

9. In an activated sludge sewage treatment process according to claim 8 wherein a plurality of pressure vessels are utilized and wherein said pressure vessels are alternately pressurized and depressurized so as to provide a substantially continuous flow of supersaturated oxygenated influent to said mixed liquor tank.

10. In an activated sludge sewage treatment process according to claim 6 wherein said portion of the influent is directed into said mixed liquor tank at the bottom thereof well away from the atmosphere-sewage interface.

11. In an activated sludge sewage treatment process according to claim 6 wherein said portion of the influent after the dissolution of said oxygen therein is alternately directed into a pair of storage cylinders wherein the pumping pressure on said portion of the influent prior to the introduction of oxygen thereto can be used to alternately direct said oxygenated influent to said mixed liquor tank.

12. In an activated sludge sewage treatment process according to claim 6 wherein said portion of the influent comprises a recycled portion of the sewage from the mixed liquor tank.

13. In an activated sludge sewage treatment process according to claim 6 wherein all of the influent to said mixed liquor tank is oxygenated in the manner indicated.

14. In an activated sludge sewage treatment process according to claim 6 wherein said portion of the influent comprises all of the influent to said mixed liquor tank plus a recycled portion of the sewage from within the tank.

* * * * *